United States Patent [19]

Bowman et al.

[11] Patent Number: 4,552,023

[45] Date of Patent: Nov. 12, 1985

[54] TRANSDUCER SYSTEMS WITH OVERLOAD PROTECTION

[75] Inventors: Ronald Bowman, Laguna Beach; Michael T. Zimmerman, Arcadia; Robert A. Rich, Yorba Linda, all of Calif.

[73] Assignee: Transamerica Delaval Inc., Lawrenceville, N.J.

[21] Appl. No.: 536,490

[22] Filed: Sep. 28, 1983

[51] Int. Cl.[4] .............................................. G01L 7/08
[52] U.S. Cl. ........................................ 73/715; 29/454
[58] Field of Search .......... 73/715, 716, 717, 718–719, 73/720, 721, 722, 723, 724, 725, 726, 727, 728, 729; 29/454, 423; 92/48, 99 R, 98

[56] References Cited

U.S. PATENT DOCUMENTS

| | | | |
|---|---|---|---|
| 2,859,613 | 11/1958 | Green | 73/141 A |
| 3,222,628 | 12/1965 | Pien | 338/4 |
| 3,341,796 | 9/1967 | Eisele | 338/5 |
| 3,353,410 | 11/1967 | MacNeil | 73/715 |
| 3,365,689 | 1/1968 | Kutsay | 338/5 |
| 3,377,866 | 4/1968 | Flavin | 338/4 |
| 3,433,064 | 3/1968 | Jacobson | 338/5 |
| 3,484,732 | 12/1969 | Postma | 338/4 |
| 3,537,318 | 11/1970 | Helin | 338/4 |
| 3,553,675 | 1/1971 | Stedman | 338/4 |
| 3,970,982 | 7/1976 | Kurtz et al. | 338/4 |
| 4,051,451 | 9/1977 | Kurtz et al. | 338/4 |
| 4,199,980 | 4/1980 | Bowman | 73/141 A |

*Primary Examiner*—Donald O. Woodiel
*Attorney, Agent, or Firm*—Benoit Law Corporation

[57] ABSTRACT

A transducer diaphragm overload protection system provides a core of insulating material for supporting a sensor and being movable relative to a deflectable diaphragm portion, and establishes a mechanical interconnection between that deflectable portion of the diaphragm and that movable core, while that core is in a movable condition. The movable core is rendered stationary relative to the diaphragm, and the mechanical interconnection is removed by establishing between the deflectable diaphragm portion and the core a gap corresponding to a predetermined diaphragm deflection, while maintaining the core stationary relative to the diaphragm. Advantageously, in pressure transducers having a ceramic core for supporting the transducer sensor, the desired gap may then be established by locating a dissolvable shim between the core and the diaphragm, while such core is movable, and by thereafter dissolving such shim after the core has become set in the transducer. Alternatively, the diaphragm may be deflected by application of an overpressure, whereby the core is moved into the desired position, and the necessary gap may thereafter be established by relaxing the diaphragm after the core has become set in the transducer.

40 Claims, 3 Drawing Figures

TRANSDUCER SYSTEMS WITH OVERLOAD PROTECTION

BACKGROUND OF THE INVENTION

1. Field of the Invention

The subject invention relates to pressure and other transducers, and to overload protection systems for transducers or for diaphragms in general.

2. Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

There are a multitude of transducers and similar devices employing diaphragms or deflectable beams in their operation. By way of example, reference may be had to the force transducer disclosed in U.S. Pat. No. 3,341,796, by W. H. Eisele, issued Sept. 12, 1967 and proposing a diaphragm stop adjustable by a threaded sleeve lockable with a hexagonal nut, to the beam-type transducers disclosed in U.S. Pat. Nos. 3,970,982 and 4,051,451, by A. D. Kurtz et al, issued July 20, 1976 and Sept. 27, 1977, respectively, and proposing the use of gross stops, the strain gage of U.S. Pat. No. 3,365,689, by A. U. Kutsay, issued Jan. 23, 1968, and proposing that a transducer body be so formed that a lower face thereof forms in the unstressed condition a desire gap between itself and an adjacent portion of the apparatus, whereby automatic overload protection was believed to be possible, to the pressure measuring instrument of U.S. Pat. No. 3,377,866, by D. J. Flavin, issued Apr. 16, 1968, and proposing the provision of a central block to form a stop for limiting movement of a stress-responsive device, to the flexible structure of U.S. Pat. No. 3,433,064, by W. E. Jacobson, issued Mar. 18, 1969, and proposing formation of a stop member out of a wall portion, and to the transducer overload protection overload system of U.S. Pat. No. 3,537,318, by R. P. Helin, issued Nov. 3, 1970, and proposing provision of a screw-adjusted stop.

Reference may also be had to various folded beam and similar structures, such as those shown in U.S. Pat. Nos. 2,859,613, by M. Green, issued Nov. 11, 1958, and showing a multiple bending beam force measuring device, 3,222,628, by H. S. Pien, issued Dec. 7, 1965, and disclosing a force measuring device, 3,484,732, by R. W. Postma, issued Dec. 16, 1969, for a dual range pressure sensor, and 3,553,625, by C. K. Stedman, issued Jan. 5, 1971 and disclosing a side-sensitive miniaturized pressure transducer.

In practice, folded beam structures are very sensitive against overload and cannot simply be protected by a stop acting on the unilaterally fixed beam of the folded beam assembly. Reference may in this respect be had to U.S. Pat. No. 4,199,980, by Ronald Bowman, one of the present coinventors, issued Apr. 29, 1980, for folded beam structure utilization methods and apparatus. In particular, that patent provides a stop system which works fine for folded beam structures and avoids the problems of previous attempts and proposals. That stop system also provides overload protection for diaphragms in many situations.

Particularly in larger transducers or in other diaphragm systems exposed to heavier loads, an overload protection system at the diaphragm itself is still desirable. Accordingly, resort has been had to screw-type or similar threaded stop system. Such systems, in practice, are, however, expensive in their implementation and require access to the assembled transducer structure for adjustment purposes. Also, there are vibration-type and other situations where use of threaded adjustment devices is undesirable or unacceptable.

SUMMARY OF THE INVENTION

It is a general object of this invention to overcome the disadvantages and to meet the needs expressed or implicit in the above disclosure statement or in other parts hereof.

It is a germane object of this invention to provide improved diaphragm overload protection systems.

It is a related object of this invention to provide improved pressure transducers.

Other objects of the invention will become apparent in the further course of this disclosure.

From a first aspect thereof, the subject invention relates to methods of providing overload protection for a diaphragm having a deflectable diaphragm portion surrounded by a stationary diaphragm portion, and connectable to a sensor. The invention according to this aspect resides, more specifically, in a combination of steps of making a core of insulating material for supporting the sensor and being movable relative to the deflectable diaphragm portion, supporting the sensor on the core, inserting the core into the stationary diaphragm portion for connection of the deflectable diaphragm portion to the sensor, but maintaining the core movable in the stationary diaphragm portion, establishing a mechanical interconnection between the deflectable diaphragm portion and the movable core, rendering the core stationary relative to the diaphragm, and removing the mechanical interconnection by establishing between the deflectable diaphragm portion and the core a gap corresponding to a predetermined maximum diaphragm deflection, while maintaining the core stationary relative to the diaphragm.

From another aspect thereof, the subject invention resides in a method of providing overload protection for a pressure transducer including a diaphragm having a deflectable diaphragm portion surrounded by a stationary diaphragm portion, and a ceramic core supporting a sensor connectable to the diaphragm, comprising in combination the steps of rendering the core movable relative to the diaphragm, establishing a mechanical interconnection between the deflectable diaphragm portion and the movable core, and connecting the sensor to the diaphragm, rendering the movable core stationary relative to the diaphragm, and removing the mechanical interconnection by establishing between the deflectable diaphragm portion and the core a gap corresponding to a predetermined maximum diaphragm deflection, while maintaining the core stationary relative to the diaphragm.

From another aspect thereof, the subject invention resides in an overload protection for a diaphragm having a deflectable diaphragm portion surrounded by a stationary diaphragm portion, in apparatus containing a core positioned by a method as herein more fully disclosed.

From a further aspect thereof, the subject invention resides in an overload protection for a pressure transducer including a diaphragm having a deflectable diaphragm portion surrounded by a stationary diaphragm portion, and a sensor supported on a core positioned by a method as more fully disclosed herein.

Other aspects of the invention will become apparent in the further course of this disclosure, and no limitation is intended by the subject summary of the invention.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
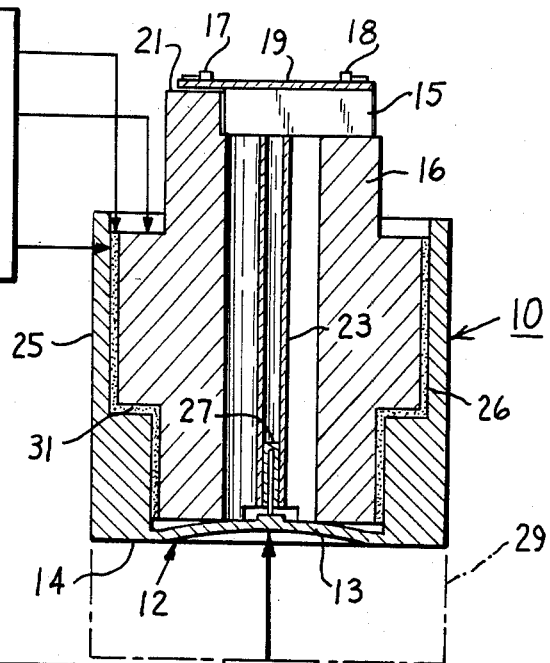
FIG. 1 is an elevational cross-section of a pressure transducer and includes a simplified flow chart of a diaphragm overload protection system according to a first embodiment of the subject invention.

The pressure transducer portion or assembly 10 shown in the drawings includes a diaphragm 12 having a deflectable diaphragm portion 13 surrounded by a stationary diaphragm portion 14. The transducer assembly also includes a sensor 15 mounted or supported on a core 16. By way of example, the sensor 15 may include gage elements 17 and 18 diffused on a flexible silicon wafer or beam 19 which, in turn, may have one end thereof connected or bonded to a mesa 21 of the core 16.

If desired, the sensor 15 may be of the folded beam type as disclosed, for instance, in the above mentioned U.S. Pat. No. 4,199,980, which is hereby incorporated by reference herein. Of course, the utility of the disclosed invention is not confined to such an arrangement.

A connector rod 23 is provided for connecting the diaphragm 12 to the sensor 15. The core 16 and connector rod 23 preferably are of a highly insulating material. By way of example, electrical insulation in the ten thousand volt range is required in the case of physiological pressure transducers and also for several other applications. Best results are currently obtained with a core of highly insulating dielectric material, such as ceramic or borosilicate glass. Such highly insulating core is herein simply referred to as ceramic core 16, though not necessarily limited to a ceramic.

The core 16 is movable or is rendered movable relative to the diaphragm 12. In this respect, the diaphragm may be connected to, integral with or have a wall portion 25 surrounding the core 16 at a clearance 26 which encompasses the core.

According to the subject invention, a mechanical interconnection is established between the deflectable diaphragm portion 13 and the movable core 16. In other words, such mechanical interconnection is established while the core is still movable. Before, during or after such mechanical interconnection, the sensor 15 is connected to the diaphragm 12. The rod 23 and an adhesive or other connector 27 is employed for this purpose according to the illustrated embodiments.

According to the aspect of the invention illustrated in FIG. 1, the mechanical interconnection is established by deflecting the deflectable diaphragm portion 13 by an amount of deflection corresponding to the gap to be provided between the diaphragm and the core 16 in the finished transducer assembly. The movable core 16 is thus positioned in contact with the deflecting diaphragm portion. In practice, there are several ways of accomplishing this requirement according to the subject invention.

For instance, during assembly of the transducer, the core 16 and diaphragm 12 may be aligned with a fit such that the core 16 is flush against the diaphragm. The diaphragm may then be loaded or otherwise deflected by an amount corresponding to the gap to be accomplished. For instance, as indicated at 28 in FIG. 1, pressure P may be applied to the diaphragm 12 at this point of time. For instance, the transducer assembly 10 may be positioned in a casing or otherwise be provided with a pressure dome or enclosure shown symbolically at 29, for the purpose of applying pressure to the diaphragm 12. By way of practical example, the diaphragm may be loaded to a value equal to two times a given overpressure.

In principle, the desired mechanical interconnection between the deflectable diaphragm portion 13 and the movable core 16 may be established by moving the core against the deflected diaphragm portion. According to a preferred embodiment of the subject invention, the deflecting diaphragm is, however, employed to reposition the movable core 16 within the wall 25 relative to the stationary diaphragm portion 14. For instance, the lower end of the core 16 may be positioned flush against the diaphragm 12 before it is deflected, and deflection of the diaphragm portion 13 may then be employed to relocate the core 16 to the position shown in FIG. 1.

Accordingly, it should be understood that the phrase "positioning the movable core in contact with the deflecting diaphragm portion," and language of similar import, are intended to cover not only the case in which the movable core 16 is placed into contact with the deflected diaphragm portion 13, but also the case in which the deflecting diaphragm portion 13 is employed to reposition the core 16 within the enclosure 25 or relative to the stationary diaphragm portion 14.

The movable core 16 is thereafter rendered stationary relative to the diaphragm. This may be done by fastening the core 16 to an adjacent part 25 of the transducer assembly 10. For instance, the movable core 16 may be rendered stationary by fastening such core to the stationary diaphragm portion 14.

According to a preferred embodiment of the subject invention, the movable core 16 is rendered stationary by providing a solidifiable substance 31, applying such solidifiable substance to the core 16 and an adjacent part 25 of the transducer, and attaching the core to such adjacent part by solidification of the substance 31.

In terms of FIG. 1, the movable core 16 is rendered stationary by fastening such core to an adjacent part 25 of the transducer assembly 10, while the deflected diaphragm portion 13 is in contact with the relocated or positioned core 16. The solidifiable substance 31 may be applied to such positioned core and an adjacent part 25 of the transducer assembly, and the positioned core may then be attached to such adjacent part 25 by solidification of the substance 31. In this or an equivalent manner, the movable core 16 is rendered stationary by fastening such position core to an adjacent part 25 of the transducer assembly, while the deflected diaphragm portion 13 is in contact with the positioned core.

In practice, the solidifiable substance 31 may be applied to the clearance 26 after the core 16 has been inserted into the assembly 10 or wall 25. Alternatively, the solidifiable substance may be applied to the outside of the core 16 and/or inside of the wall portion 25 before the core 16 is inserted into the assembly or wall portion, or while the core 16 is being so inserted.

Figure 2:
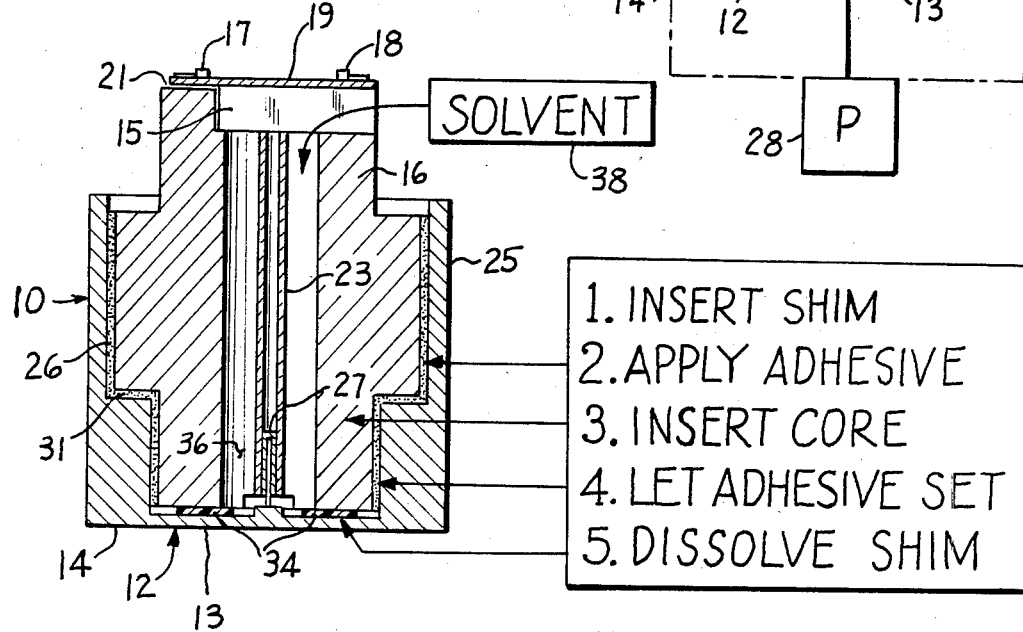
FIG. 2 is an elevational cross-section of a pressure transducer and includes a simplified flow chart of a diaphragm overload protection system according to a second embodiment of the subject invention.

Accordingly, while the flow charts in FIGS. 1 and 2 specify application of an adhesive prior to insertion of the core, that suggestion can actually be reversed or rendered simultaneous as far as the solidifiable substance 31 is concerned.

Various solidifiable substances may be employed at 31. For instance, an adhesive or cement, such as an epoxy resin or a urethane cement may be used at 31 for fastening the core 16 to the wall 25 or stationary diaphragm portion 14. An epoxy adhesive is presently preferred for rendering the movable core 16 stationary relative to the stationary diaphragm portion 14.

Figure 3:
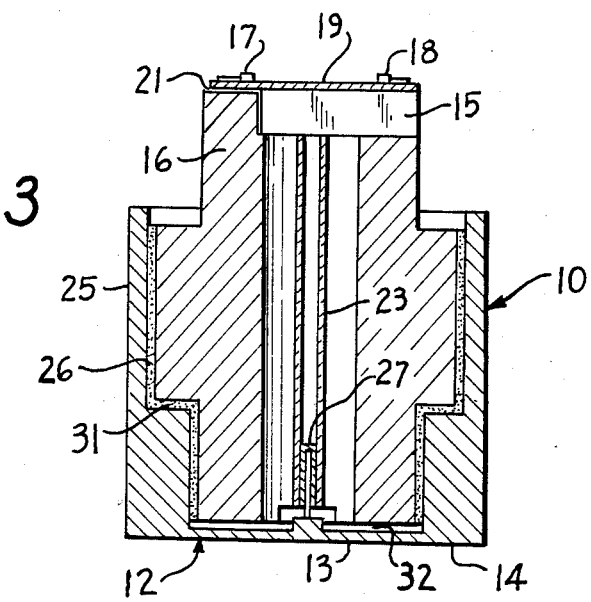
FIG. 3 is an elevational cross-section of a pressure transducer representing the overload protected product of the system of either FIGS. 1 or 2.

The desired gap shown at 32 in FIG. 3 is established by permitting the diaphragm 12 or deflected diaphragm portion 13 to relax or flex away from the positioned core 16 after such core has been rendered stationary or fastened to the adjacent part 25 of the transducer assembly, such as by solidification of the substance 31. Where an overpressure has been applied to the diaphragm as shown at 28 in FIG. 1, the gap 32 shown in FIG. 3 may be established by removing such overpressure from the diaphragm. This is thus one way of removing the mentioned mechanical interconnection between the deflectable diaphragm portion 13 and the core 16 by establishing between the deflectable diaphragm portion and the core a gap 32 corresponding to a predetermined maximum diaphragm deflection, while maintaining the core 16 stationary relative to the diaphragm, as just disclosed.

Another way according to a further preferred embodiment of the subject invention is shown in FIG. 2. In particular, the mentioned mechanical interconnection between the deflectable diaphragm portion 13 and the movable core 16 is established by placing between such deflectable diaphragm portion and the movable core one or more shims 34. If desired, such shims could be placed immediately adjacent the stationary diaphragm portion and the core. However, that would still amount to a placement of the shim or shims 34 between the deflectable diaphragm portion and the movable core, since the diaphragm is in principle deflectable up to the solid rim of the diaphragm.

In practice, it appears preferable to place the shim or shims 34 adjacent the central bore 36 of the core, so as to facilitate dissolution of the shim or shims, as hereinafter disclosed.

Instead of two or more shims 34, an annular shim encompassing the central boss of the diaphragm may be employed. Accordingly, the shim 34 will hereafter only be referred to in the singular.

The shim 34 is employed for establishing a mechanical interconnection between the deflectable diaphragm portion 13 and the movable core 16. By way of example, and as apparent from the flow sheet diagram in FIG. 2, the shim 34 is inserted prior to the core 16. For instance, the shim 34 may be placed on top of the flexible diaphragm portion 13, and the movable core 16 may thereafter be inserted on top of that shim. As in the case of the embodiment shown in FIG. 1, the solidifiable substance or settable adhesive 31 may in the embodiment of FIG. 2 be applied to the core 16 and/or wall portion 25 prior to, simultaneously with, or after insertion of the core 16 into the diaphragm or wall portion 25. In either case, the inserted core 16 comes to rest on the shim 34, which thereby serves to establish the desired mechanical interconnection between the deflectable diaphragm portion 13 and the movable core 16. The diaphragm or deflectable diaphragm portion is again connected to the sensor, such as by the conventional force rod 23 and interconnection 27. In this respect, the same adhesive may be employed at 27 and 31.

The desired gap 32 is established by removing the shim 34 after the core 16 has been rendered stationary, such as by a setting of the adhesive in the gap 26, or solidification of another substance 31.

In this respect, a solder or other solidifiable substance could alternatively be used at 31, even though use of an adhesive, particularly of the epoxy type, is presently preferred.

According to a favored embodiment of the subject invention, the mentioned mechanical interconnection is established by placing or providing between the deflectable diaphragm portion 13 and the movable core 16 a shim 34 of dissolvable or dissoluble material corresponding in thickness to the desired gap 32. Such gap is thereafter established by dissolving the shim 34 after the core has been rendered stationary in any of the above mentioned or equivalent ways or manners.

In practice, there are various ways in which a shim could be dissolved. For instance, the shim 34 could be made of a low melting point material, such as a wax or a low melting point alloy, and could thereafter be melted away or otherwise removed by application of sufficient heat. The expressions "dissolvable" and "dissolving" as herein employed are intended to be broad enough to cover these and other techniques for first providing and then removing the shims 34. Of course, it is also possible to remove these shims mechanically, but it may not always be convenient to design the transducer assembly with the necessary escape route for this purpose.

It is presently preferred that the shim 34 be made of a substance that will easily dissolve, as compared to the solidified substance or set adhesive 31.

In this respect, the shim 34 may be made of gelatine which is easily dissolved by application of water. Other examples include the making of the shim 34 of polystyrene or polycarbonate, which is easily removed by application of a solvent 38 thereto.

Of course, care should be taken that a solvent is employed that does not affect the solidified substance or set adhesive 31. For instance, chlorinated hydrocarbons, such as methylene chloride, perchloroethane, trichloroethane and the like, preferably should not be employed if the adhesive at 31 is an epoxy resin.

On the other hand, xylene, tetrahydrofuran, dimethyl formamide, acetone or methyl ethyl ketone may be employed for dissolution of the shim 34. By way of example, the particular solvent 38 may be poured into the transducer assembly 10 through the axial bore 36 of the set core 16.

Dissolution or other removal of the shim 34 amounts to removal of the above mentioned mechanical interconnection between the deflectable diaphragm portion and the core 16, and establishment of the desired gap 32 therebetween.

In this respect, the thickness of the gap 32 shown in FIG. 3, as well as the amount of deflection of the diaphragm 13 shown in FIG. 1 and the thickness of the shim 34 shown in FIG. 2 may in many applications be much smaller than as shown mainly for ease of understanding in these drawings. For instance, in a practical pressure transducer, the amount of deflection in the embodiment shown in FIG. 1 or the thickness of the shim 34 in the embodiment shown in FIG. 2 may be on the order of 0.0006 to 0.001 inches or 15 to 25 microns, for provision of a gap 32 of that order.

The transducer assembly 10 shown in FIG. 3 may be incorporated in a larger assembly including, for instance, a housing with electrical terminals for the sensor 15 and a dome or other coupling facility for applying pressure signals to the diaphragm 14, such as by way of a conventional fluid line or conduit (not shown).

Various other modifications, variations and extensions within the spirit and scope of the subject invention and equivalents thereof are suggested to those skilled in the art by the subject extensive disclosure.

We claim:

1. A method of providing overload protection for a diaphragm having a deflectable diaphragm portion surrounded by a stationary diaphragm portion and connectable to a sensor, comprising in combination the steps of:
   making a core of insulating material for supporting said sensor and being movable relative to said deflectable diaphragm portion;
   supporting said sensor on said core;
   inserting said core into said stationary diaphragm portion for connection of said deflectable diaphragm portion to said sensor, but maintaining said core movable in said stationary diaphragm portion;
   establishing a mechanical interconnection between said deflectable diaphragm portion and said movable core;
   rendering said core stationary relative to said diaphragm; and
   removing said mechanical interconnection by establishing between said deflectable diaphragm portion and said core a gap corresponding to a predetermined maximum diaphragm deflection, while maintaining said core stationary relative to said diaphragm.

2. A method as claimed in claim 1, wherein:
   said mechanical interconnection is established by placing between said deflectable diaphragm portion and said movable core of insulating material a shim corresponding in thickness to said gap; and
   said gap is established by removing said shim after said movable core of insulating material has been rendered stationary.

3. A method as claimed in claim 1, wherein:
   said mechanical interconnection is established by placing between said deflectable diaphragm portion and said movable core a shim of dissolvable material corresponding in thickness to said gap; and
   said gap is established by dissolving said shim after said core has been rendered stationary.

4. A method as claimed in claim 1, wherein:
   said movable core is rendered stationary by fastening said core to an adjacent stationary part.

5. A method as claimed in claim 1, wherein:
   said movable core is rendered stationary by fastening said core to said stationary diaphragm portion.

6. A method as claimed in claim 1, wherein:
   said movable core is rendered stationary by providing a solidifiable substance, applying said solidifiable substance to said core and an adjacent stationary part, and attaching said core to said adjacent stationary part by solidification of said substance.

7. A method as claimed in claim 1, wherein:
   said mechanical interconnection is established by deflecting said deflectable diaphragm portion by an amount of deflection corresponding to said gap and positioning said movable core in contact with said deflecting diaphragm portion; and
   said gap is established by permitting said diaphragm to relax away from said positioned core after said core has been rendered stationary.

8. A method as claimed in claim 1, wherein:
   said mechanical interconnection is established by deflecting said deflectable diaphragm portion by an amount of deflection corresponding to said gap and positioning said movable core in contact with said deflecting diaphragm portion;
   said movable core is rendered stationary by fastening said core to said stationary diaphragm portion while said deflected diaphragm portion is in contact with said positioned core; and
   said gap is established by permitting said diaphragm to relax away from said positioned core after said core has been fastened to said stationary diaphragm portion.

9. A method as claimed in claim 1, wherein:
   said mechanical interconnection is established by deflecting said deflectable diaphragm portion by an amount of deflection corresponding to said gap and positioning said movable core in contact with said deflecting diaphragm portion;
   said movable core is rendered stationary by providing a solidifiable substance, applying said solidifiable substance to said positioned core and said stationary diaphragm portion and attaching said positioned core to said stationary diaphragm portion by solidification of said substance; and
   said gap is established by permitting said diaphragm to relax away from said positioned core after solidification of said substance.

10. A method as claimed in claim 1, wherein:
    said apparatus is arranged as a pressure transducer;
    said mechanical interconnection is established by applying a predetermined overpressure to said diaphragm portion by an amount of deflection corresponding to said gap and positioning said movable core in contact with said deflecting diaphragm portion;
    said movable core is rendered stationary by fastening said positioned core to an adjacent part of said pressure transducer while said deflected diaphragm portion is in contact with said positioned core; and said gap is established by removing said overpressure from said diaphragm.

11. A method of providing overload protection for a pressure transducer including a diaphragm having a deflectable diaphragm portion surrounded by a stationary diaphragm portion, and a ceramic core supporting a sensor connectable to said diaphragm, comprising in combination the steps of:
rendering said core movable relative to said diaphragm;
establishing a mechanical interconnection between said deflectable diaphragm portion and said movable core, and connecting said sensor to said diaphragm;
rendering said movable core stationary relative to said diaphragm; and
removing said mechanical interconnection by establishing between said deflectable diaphragm portion and said core a gap corresponding to a predetermined maximum diaphragm deflection, while maintaining said core stationary relative to said diaphragm.

12. A method as claimed in claim 11, wherein:
said mechanical interconnection is established by placing between said deflectable diaphragm portion and said movable core a shim corresponding in thickness to said gap; and
said gap is established by removing said shim after said core has been rendered stationary.

13. A method as claimed in claim 11, wherein:
said mechanical interconnection is established by placing between said deflectable diaphragm portion and said movable core a shim of dissolvable material corresponding in thickness to said gap; and
said gap is established by dissolving said shim after said core has been rendered stationary.

14. A method as claimed in claim 11, wherein:
said movable core is rendered stationary by fastening said core to an adjacent part of said apparatus.

15. A method as claimed in claim 11, wherein:
said movable core is rendered stationary by fastening said core to said stationary diaphragm portion.

16. A method as claimed in claim 11, wherein:
said movable core is rendered stationary by providing a solidifiable substance, applying said solidifiable substance to said core and an adjacent part of said transducer, and attaching said core to said adjacent part by solidification of said substance.

17. A method as claimed in claim 11, wherein:
said mechanical interconnection is established by deflecting said deflectable diaphragm portion by an amount of deflection corresponding to said gap and positioning said movable core in contact with said deflecting diaphragm portion; and
said gap is established by permitting said diaphragm to relax away from said positioned core after said core has been rendered stationary.

18. A method as claimed in claim 11, wherein:
said mechanical interconnection is established by deflecting said deflectable diaphragm portion by an amount of deflection corresponding to said gap and positioning said movable core in contact with said deflecting diaphragm portion;
said movable core is rendered stationary by fastening said core to an adjacent part of said transducer while said deflected diaphragm portion is in contact with said positioned core; and
said gap is established by permitting said diaphragm to relax away from said positioned core after said core has been fastened to said adjacent part.

19. A method as claimed in claim 11, wherein:
said mechanical interconnection is established by deflecting said deflectable diaphragm portion by an amount of deflection corresponding to said gap and positioning said movable core in contact with said deflecting diaphragm portion;
said movable core is rendered stationary by providing a solidifiable substance, applying said solidifiable substance to said positioned core and an adjacent part of said transducer, and attaching said positioned core to said adjacent part by solidification of said substance; and
said gap is established by permitting said diaphragm to relax away from said positioned core after solidification of said substance.

20. A method as claimed in claim 11, wherein:
said mechanical interconnection is established by applying a predetermined overpressure to said diaphragm so as to deflect said deflectable diaphragm portion by an amount of deflection corresponding to said gap and positioning said movable core in contact with said deflecting diaphragm portion;
said movable core is rendered stationary by fastening said positioned core to an adjacent part of said transducer while said deflected diaphragm portion is in contact with said positioned core; and
said gap is established by removing said overpressure from said diaphragm.

21. An overload protection for a diaphragm having a deflectable diaphragm portion surrounded by a stationary diaphragm portion and connectable to a sensor, in apparatus containing a core positioned by a method comprising in combination the steps of:
making said core of insulating material for supporting said sensor and making said core movable relative to said deflectable diaphragm portion;
supporting said sensor on said core;
inserting said core into said stationary diaphragm portion for connection of said deflectable diaphragm portion to said sensor, but maintaining said core movable in said stationary diaphragm portion;
establishing a mechanical interconnection between said deflectable diaphragm portion and said movable core while said core is in a movable condition;
rendering said movable core stationary relative to said diaphragm; and
removing said mechanical interconnection by establishing between said deflectable diaphragm portion and said core a gap corresponding to a predetermined maximum diaphragm deflection, while maintaining said core stationary relative to said diaphragm.

22. An overload protection as claimed in claim 21, wherein:
said mechanical interconnection is established by placing between said deflectable diaphragm portion and said movable core of insulating material a shim corresponding in thickness to said gap; and
said gap is established by removing said shim after said movable core of insulating material has been rendered stationary.

23. An overload protection as claimed in claim 21, wherein:

said mechanical interconnection is established by placing between said deflectable diaphragm portion and said movable core a shim of dissolvable material corresponding in thickness to said gap; and said gap is established by dissolving said shim after said core has been rendered stationary.

24. An overload protection as claimed in claim 21, wherein:
said movable core is rendered stationary by fastening said core to an adjacent stationary part of said apparatus.

25. An overload protection as claimed in claim 21, wherein:
said movable core is rendered stationary by fastening said core to said stationary diaphragm portion.

26. An overload protection as claimed in claim 21, wherein:
said movable core is rendered stationary by providing a solidifiable substance, applying said solidifiable substance to said core and an adjacent stationary part of said apparatus, and attaching said core to said adjacent stationary part by solidification of said substance.

27. An overload protection as claimed in claim 21, wherein:
said mechanical interconnection is established by deflecting said deflectable diaphragm portion by an amount of deflection corresponding to said gap and positioning said movable core in contact with said deflecting diaphragm portion; and
said gap is established by permitting said diaphragm to relax away from said positioned core after said core has been rendered stationary.

28. An overload protection as claimed in claim 21, wherein:
said mechanical interconnection is established by deflecting said deflectable diaphragm portion by an amount of deflection corresponding to said gap and positioning said movable core in contact with said deflecting diaphragm portion;
said movable core is rendered stationary by fastening said core to an adjacent part of said apparatus while said deflected diaphragm portion is in contact with said positioned core; and
said gap is established by permitting said diaphragm to relax away from said positioned core after said core has been fastened to said adjacent part.

29. An overload protection as claimed in claim 21, wherein:
said mechanical interconnection is established by deflecting said deflectable diaphragm portion by an amount of deflection corresponding to said gap and positioning said movable core in contact with said deflecting diaphragm portion;
said movable core is rendered stationary by providing a solidifiable substance, applying said solidifiable substance to said positioned core and an adjacent part of said apparatus, and attaching said positioned core to said adjacent part by solidification of said substance; and
said gap is established by permitting said diaphragm to relax away from said positioned core after solidification of said substance.

30. An overload protection as claimed in claim 21, wherein:
said apparatus is arranged as a pressure transducer;

said mechanical interconnection is established by applying a predetermined overpressure to said diaphragm so as to deflect said deflectable diaphragm portion by an amount of deflection corresponding to said gap and positioning said movable core in contact with said deflecting diaphragm portion;
said movable core is rendered stationary by fastening said positioned core to an adjacent part of said apparatus while said deflected diaphragm portion is in contact with said positioned core; and
said gap is established by removing said overpressure from said diaphragm.

31. An overload protection for a pressure transducer including a diaphragm having a deflectable diaphragm portion surrounded by a stationary diaphragm portion, and a sensor supported on a core positioned by a method comprising in combination the steps of:
rendering said core movable relative to said diaphragm;
establishing a mechanical interconnection between said deflectable diaphragm portion and said movable core, and connecting said sensor to said diaphragm;
rendering said movable core stationary relative to said diaphragm; and
removing said mechanical interconnection by establishing between said deflectable diaphragm portion and said core a gap corresponding to a predetermined maximum diaphragm deflection, while maintaining said core stationary relative to said diaphragm.

32. An overload protection as claimed in claim 31, wherein:
said mechanical interconnection is established by placing between said deflectable diaphragm portion and said movable core a shim corresponding in thickness to said gap; and
said gap is established by removing said shim after said core has been rendered stationary.

33. An overload protection as claimed in claim 31, wherein:
said mechanical interconnection is established by placing between said deflectable diaphragm portion and said movable core a shim of dissolvable material corresponding in thickness to said gap; and
said gap is established by dissolving said shim after said core has been rendered stationary.

34. An overload protection as claimed in claim 31, wherein:
said movable core is rendered stationary by fastening said core to an adjacent part of said apparatus.

35. An overload protection as claimed in claim 31, wherein:
said movable core is rendered stationary by fastening said core to said stationary diaphragm portion.

36. An overload protection as claimed in claim 31, wherein:
said movable core is rendered stationary by providing a solidifiable substance, applying said solidifiable substance to said core and an adjacent part of said transducer, and attaching said core to said adjacent part by solidification of said substance.

37. An overload protection as claimed in claim 31, wherein:
said mechanical interconnection is established by deflecting said deflectable diaphragm portion by an amount of deflection corresponding to said gap and positioning said movable core in contact with said deflecting diaphragm portion; and said gap is established by permitting said diaphragm to relax away from said positioned core after said core has been rendered stationary.

38. An overload protection as claimed in claim 31, wherein:

said mechanical interconnection is established by deflecting said deflectable diaphragm portion by an amount of deflection corresponding to said gap and positioning said movable core in contact with said deflecting diaphragm portion;

said movable core is rendered stationary by fastening said core to an adjacent part of said transducer while said deflected diaphragm portion is in contact with said positioned core; and said gap is established by permitting said diaphragm to relax away from said positioned core after said core has been fastened to said adjacent part.

39. An overload protection as claimed in claim 31, wherein:

said mechanical interconnection is established by deflecting said deflectable diaphragm portion by an amount of deflection corresponding to said gap and positioning said movable core in contact with said deflecting diaphragm portion;

said movable core is rendered stationary by providing a solidifiable substance, applying said solidifiable substance to said positioned core and an adjacent part of said transducer, and attaching said positioned core to said adjacent part by solidification of said substance; and said gap is established by permitting said diaphragm to relax away from said positioned core after solidification of said substance.

40. An overload protection as claimed in claim 31, wherein:

said mechanical interconnection is established by applying a predetermined overpressure to said diaphragm so as to deflect said deflectable diaphragm portion by an amount of deflection corresponding to said gap and positioning said movable core in contact with said deflecting diaphragm portion;

said movable core is rendered stationary by fastening said positioned core to an adjacent part of said transducer while said deflected diaphragm portion is in contact with said positioned core; and said gap is established by removing said overpressure from said diaphragm.

* * * * *